April 7, 1936.  D. G. K. MOSS  2,036,229
GYROSCOPIC NAVIGATION INSTRUMENT
Filed June 25, 1935   2 Sheets-Sheet 1
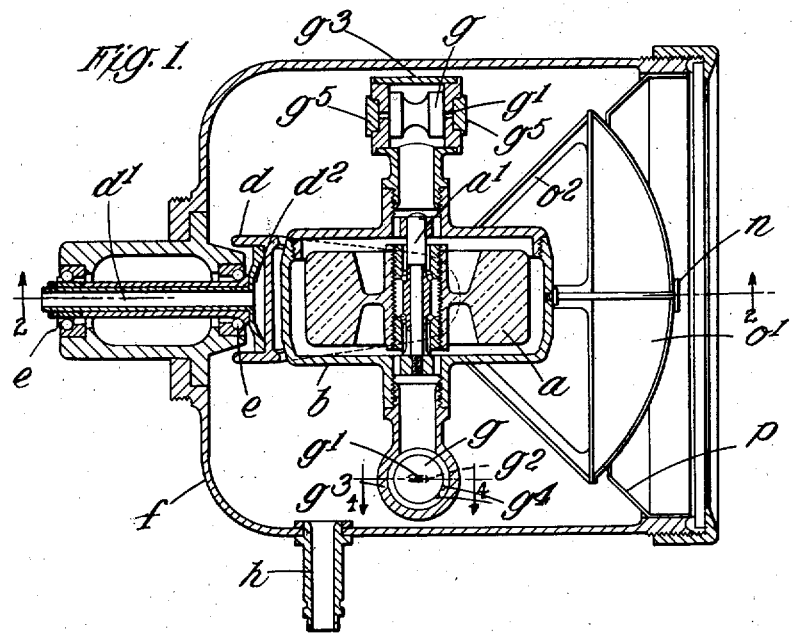
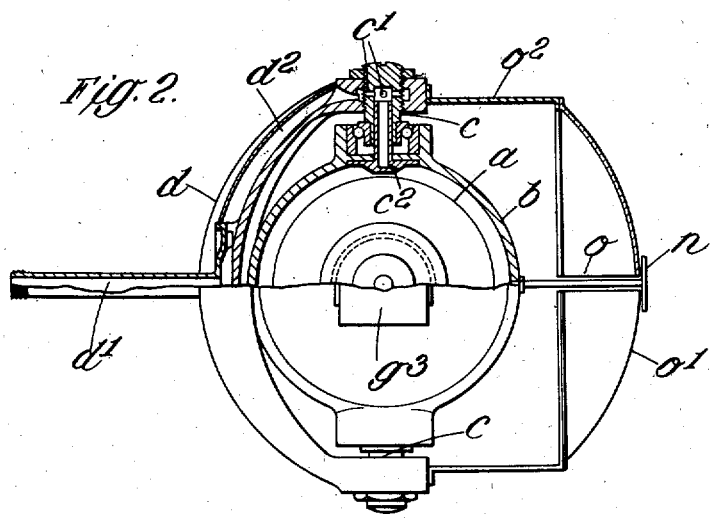
Douglas George King Moss
INVENTOR
By Otto Munk
his ATTY.

April 7, 1936.    D. G. K. MOSS    2,036,229
GYROSCOPIC NAVIGATION INSTRUMENT
Filed June 25, 1935    2 Sheets-Sheet 2
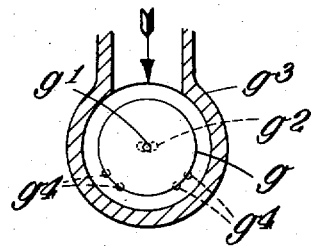
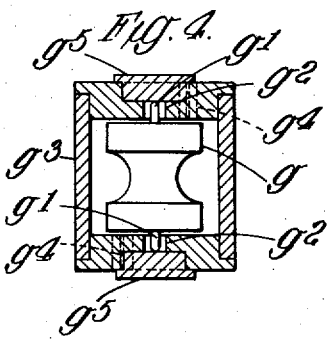
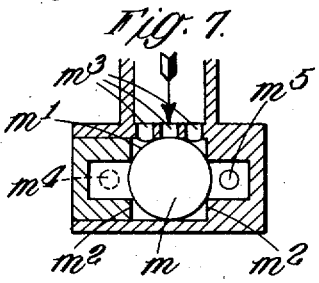
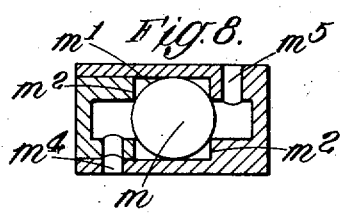
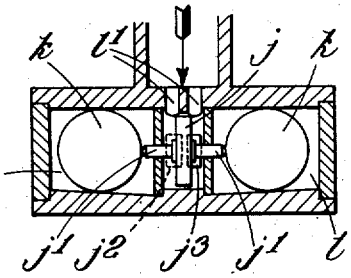
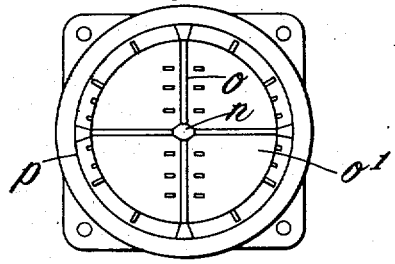
Douglas George King Moss
INVENTOR
By Otto Munk
his ATTY.

Patented Apr. 7, 1936

2,036,229

UNITED STATES PATENT OFFICE 2,036,229

GYROSCOPIC NAVIGATION INSTRUMENT

Douglas George King Moss, Sanderstead, England

Application June 25, 1935, Serial No. 28,293
In Great Britain June 14, 1934

9 Claims. (Cl. 33—204)

This invention relates to gyroscopic navigational instruments—more particularly artificial horizons or gyro verticals—for use on aircraft and watercraft (both surface and under-water craft) and has for its chief object to provide improved means for producing an erecting torque. A further object is to provide complete freedom of movement of the casing of the instrument relatively to the mechanism within it, and of the fore and aft indicating member relatively to the cross level dial and the latter relatively to the casing.

According to this invention, the means for producing an erecting torque comprise valves in the form of or controlled by rolling bodies, the valves being arranged in valve chambers having oppositely disposed air-jet orifices, so that when the gyro casing or other fixed member supporting the gyro departs from the normal, the valves move and permit air jets of unequal intensity to pass through the orifices at right angles to the displacement of the wheel axis and thereby produce an erecting torque. The freedom of movement in a cross level direction referred to is obtained according to this invention by mounting the outer gimbal support in a single bearing, thus permitting a complete roll.

In order that this invention may be the more clearly understood and readily carried into effect, I will proceed to describe the same with reference to the accompanying drawings, which illustrate by way of example, and not of limitation, certain convenient embodiments of this invention, and in which Figure 1 is a vertical section through a gyro vertical, and shows rolling disc valves arranged so that they can roll to control the air jets.

Figure 2 is a sectional plan of the same with the casing removed taken on line 2—2 of Fig. 1.

Figure 3 is an enlarged vertical section of a portion of Figure 1, Figure 4 is a horizontal section taken on line 4—4 of Figure 1, on an enlarged scale, of one of the valve chambers shown in Figure 1.

Figures 5 and 6 are vertical and horizontal sections respectively of a modification showing a valve in the form of a plunger and balls or rollers for operating it, all arranged in a valve chamber.

Figures 7 and 8 are vertical and horizontal sections respectively of a further modification showing a valve in the form of a ball or roller arranged in a valve chamber.

Figure 9 is a front view of the instrument on a reduced scale.

Referring to the drawings, the gyro wheel $a$ is rotatably mounted on a vertical spindle $a^1$ in an air-tight casing $b$ which constitutes an inner gimbal and which is rotatably mounted on inner gimbal trunnions $c$ carried by an outer U-shaped gimbal $d$ which in turn is rotatably mounted by means of a hollow spindle $d^1$ in spaced bearings $e$ forming an outer gimbal trunnion. This trunnion is housed in the back of the casing $f$. The axes of the trunnions intersect the vertical axis of the gyro wheel at the centre of the moving system. By using only one trunnion bearing for the outer gimbal it becomes possible for the instrument case to revolve unhindered about the dial, whereby a complete roll or a series of rolls, if the instrument be mounted on an aircraft, may be executed without upsetting the instrument. Steadiness is imparted to the spindle $d^1$ by spacing the bearings $e$ as shown.

Referring now to the devices, as shown in Figures 1, 2, 3 and 4, for producing the erecting torque, these comprise disc valves $g$ which are so disposed that their centres are coincident with the axis of rotation of the gyro wheel when that axis is truly vertical. The valves are mounted on central pins $g^1$ which can roll in arcuate slots $g^2$ in the valve chamber $g^3$, the rolling axes of the valves being at right angles to one another. The slots $g^2$ are curved so as to give the moving control a bias to settle in true centre. The valve chambers are provided at each end with air-exit orifices $g^4$ arranged so that normally they are opened, to an equal extent, by the valve (the dotted circles $g^4$ in Figure 3 indicate the orifices at the end of the valve chamber which, of course, do not appear in this figure). In order to reduce friction between the ends of the valve and the valve chamber, the ends of the pins $g^1$ are radiused and burnished and they are arranged to contact lightly with plugs $g^5$ which are inserted in the cheeks of the valve chamber so as to keep the ends of the valve clear of the cheeks. These plugs also serve to prevent escape of air through the slots $g^2$.

I will now deal with the air-flow which drives the gyro wheel and subsequently is controlled by the valves so as to produce an erecting torque should the wheel spinning axis be disposed from vertical. Usually, a Venturi suction tube or other suitable means is attached to the tube $h$, and in flight air is drawn through the hollow spindle $d^1$ at the inner end of which the air-stream divides and passes through a channel in each horn of the gimbal $d$ and then through inlet orifices in the inner gimbal bearings whence it passes through the trunnion and issues through an exit orifice as a jet which impinges on and drives the gyro wheel. As this construction of the horn of the gimbal $d$ and the trunnion is the same on each side of the gyro wheel it will suffice to identify the parts shown in section in Figure 2; in that figure $d^2$ is the air-channel, $c^1$ are the air inlet orifices and $c^2$ is the exit orifice. The air stream passes from the casing $b$ into the valve chambers $g^3$. When the gyro wheel axis deviates from the true vertical one or both of the valves will roll (depending upon whether the deviation is in a direction fore-and-aft or thwartships, or in both directions) thus uncovering a greater area of the exit orifices $g^4$ at one end of the valve chamber and covering a greater area of the exit orifices $g^4$ at the other end of the valve chamber, and thereby varying the intensity of the issuing air-jets and consequently producing the desired erecting torque. In the case of excessive deviation, the exit orifices $g^4$ will be completely opened at one end and completely closed at the other end.

In the arrangement shown in Figures 5 and 6, $j$ is a plunger valve which is provided with pins $j^1$ engaged by balls or rollers $k$ which are free to roll in the chamber $l$. The air-exit orifices are shown at $j^2$ and $j^3$, and they are oppositely directed, the dotted lines in Figure 5 representing the orifice $j^2$ which, of course, does not appear in the figure. The air stream from the gyro wheel casing $b$ passes through the orifices $l^1$ (Figure 5). Normally, the valve occupies the mid-position as shown and the air-stream issues with equal intensity through both of the orifices $j^2$ and $j^3$. Deviation of the axis of the gyro wheel from true vertical, however, causes the balls to roll and thereby displace the valve resulting in an out-of-balance being established between the air streams issuing through the orifices $j^2$ and $j^3$ with consequent production of the required erecting torque. The tracks along which the balls roll preferably slope downwards towards the valve so as to ensure that the balls remain in contact with the pins $j^1$.

In the arrangement shown in Figures 7 and 8, there is a single ball or roller $m$ arranged so that it can roll freely in a valve chamber $m^1$. At each end the chamber is constricted by means of the shoulder $m^2$ which limits the motion of the rolling member $m$. The air-exit orifices are shown at $m^4$ and $m^5$ and are oppositely directed, the dotted lines in Figure 7 representing the orifice $m^4$ which does not, of course, appear in the figure. The air-stream enters at $m^3$ (Figure 7) and normally leaves the valve chamber through the orifices $m^4$ and $m^5$ with equal intensity. When, however, the axis of the gyro wheel deviates from true vertical a correcting torque is set up in the manner above described.

The desired indications are obtained by means of an indicator $n$ (Figures 1, 2 and 9) which is attached to the gyroscope wheel casing $b$ so as to extend at right angles to the wheel axis and also at right angles to the trunnion bearings $c$. This indicator works in a slot $o$ in a dial $o^1$ which is carried by a spider $o^2$, fixed to the gimbal $d$. When there is any deviation from the true level in the fore and aft direction relative movement takes place between the indicator and the cross level dial $o^1$ and the extent of the deviation is indicated by the position of the indicator in the slot $o$. Any deviation from the true level in athwartships direction is indicated by the displacement of a ring $p$ (Figure 1) which is fixed to the casing $f$, relatively to the dial $o^1$, the ring being preferably marked in degrees and the dial being suitably marked so that the extent of the displacement can be ascertained with ease. The true level is indicated by the setting of the indicator $n$ in the middle of the dial with the dial itself positioned vertical in the outer casing.

It is to be understood that the position of the controlling valves on the inner gimbal may be varied so long as the air jets act to produce the erecting torque. Also, the air-stream for these jets may be supplied from some other source than that employed to drive the gyro wheel.

I claim:—

1. In a gyroscopic navigational instrument, a gyroscope having a normally vertical spin axis, a casing therefor, means for mounting the casing for universal movement about mutually normal horizontal axes, said casing having a chamber communicating therewith, said chamber having a pair of oppositely directed orifices offset from the plane of said axes, rolling valve means within said chamber to control the opening and closing of said orifices, respectively, in accordance with the direction of tilt of the spin axis when it departs from the normal vertical, to open one and close another orifice to apply a precessing torque to the gyroscope through the resulting unbalanced air jets.

2. In a gyroscopic navigational instrument, a gyro wheel, a closed casing around the wheel, valve chambers communicating with said casing, each having a pair of oppositely-directed air-exits and arcuate slots adjacent thereto, and a disc valve in each chamber rollingly supported by the respective slots to close one of said exits and open the other, respectively, in accordance with the direction of tilt of the gyro spin axis, to apply a precessing torque to the gyro wheel through the resulting unbalanced air jets.

3. In a gyroscopic navigational instrument, a gyro wheel having a spin axis normally substantially vertical, a casing for the gyro wheel having a chamber with air-inlet and oppositely-directed air-exit orifices, a ball valve in said chamber adapted to open and close said exit orifices, respectively, upon inclination of the gyro spin axis from normal position, whereby upon departure of the gyro wheel axis from the true vertical and in accordance with the direction of tilt of the gyro spin axis, said ball valve rolls to close one and open the other exit orifice to apply a precessing torque to the gyro wheel through the resulting unbalanced air jet emerging from the open exit.

4. In a gyroscopic navigational instrument, a gyro wheel having a spin axis normally substantially vertical, a casing for the gyro wheel having a chamber with air-inlet and oppositely directed air-exit orifices and curved slots adjacent each orifice, a disc valve supported in said chamber by means of pins at its ends resting in said slots and adapted to open and close the exit orifices respectively, upon inclination of the gyro spin axis from normal position, whereby upon departure of the gyro wheel axis from the true vertical and in accordance with the direction of the tilt of the gyro spin axis, said disc valve rolls to cover one and uncover another orifice to apply a precessing torque to the gyro wheel through the unbalanced air jet emerging from the open exit.

5. In a gyroscopic navigational instrument, a gyro wheel having a spin axis normally substantially vertical, a casing for the gyro wheel having a chamber with air-inlet and oppositely directed air-exit orifices, a plunger valve in said chamber positioned to control said air-exit orifices, and rolling members on opposite sides of said valve arranged so that upon departure of the gyro wheel axis from the true vertical and in accordance with the direction of the tilt of the gyro spin axis, the rolling members will move the valve in a direction to close one of the air-exits to apply an erecting torque to the gyro wheel through the unbalanced air jet emerging from the other exit orifice which is opened in the same proportion to the amount that the other is closed.

6. In a gyroscopic navigational instrument, a gyro wheel, an air-tight casing around the gyro wheel, valve chambers connected with said casing and each having a pair of oppositely directed air-exits, plunger valves in said chambers, pins projecting from said valves on opposite sides thereof, and rolling members arranged to engage said pins so as to cause the valves to tend to close one of said exis, respectively, in accordance with the direction of tilt of the gyro spin axis, to apply a precessing torque to the gyro wheel through the unbalanced air jet emerging from the other exit.

7. In a gyroscopic navigational instrument, a gyro wheel, an air-tight casing around the gyro wheel, valve chambers connected with said casing and each having oppositely directed air exits, rolling members in said chambers, and means controlled by said rolling members to tend to close one of said exits, respectively, in accordance with the direction of tilt of the gyro spin axis, to apply a precessing torque to the gyro wheel through the unbalanced air jet emerging from the other exit.

8. In a gyroscopic navigational instrument, a gyro wheel having a normally vertical spin axis, a casing therefor having a chamber with oppositely directed orifices, an outer gimbal, said casing constituting the inner gimbal, whereby the gyro wheel and casing are universally supported, rolling valve means in said chamber to tend to close one of said orifices in accordance with the tilt of the gyro spin axis, to apply a precessing torque to the gyro wheel through the unbalanced air jet emerging through the other orifices, the outer gimbal being supported by a bearing on one side only of said casing, a dial having a slot connected to said outer gimbal, and an indicator fixed to the inner gimbal and projecting through said slot so that the extent of movement between the dail and the indicator can be read.

9. In a gyroscopic navigational instrument, a gyro wheel having a normally vertical spin axis, a casing therefor having a chamber with oppositely directed orifices, rolling valve means within said chamber tending to control the opening and closing of said orifices, whereby when the axis of the gyro wheel departs from the normal position one of said orifices will tend to close so as to apply a precessing torque to the gyro wheel through the resulting unbalanced air jet, an outer gimbal supported by a bearing on one side only of the casing, said casing constituting the inner gimbal, forming a universal support for the gyro and casing, a dial having a slot connected to said outer gimbal, and an indicator fixed to the casing and projecting through said slot so that the extent of movement between the dial and the indicator can be read, and a second indicator stationary with respect to the casing and cooperating with said dial to indicate the extent of movement between the second indicator and the dial.

DOUGLAS GEORGE KING MOSS.

DISCLAIMER 2,036,229.—*Douglas George King Moss*, Sanderstead, England. GYROSCOPIC NAVIGATION INSTRUMENT. Patent dated April 7, 1936. Disclaimer filed November 16, 1937, by the patentee.

Hereby enters this disclaimer to claim 3 in said specification.

[*Official Gazette December 7, 1937.*]

arranged so that upon departure of the gyro wheel axis from the true vertical and in accordance with the direction of the tilt of the gyro spin axis, the rolling members will move the valve in a direction to close one of the air-exits to apply an erecting torque to the gyro wheel through the unbalanced air jet emerging from the other exit orifice which is opened in the same proportion to the amount that the other is closed.

6. In a gyroscopic navigational instrument, a gyro wheel, an air-tight casing around the gyro wheel, valve chambers connected with said casing and each having a pair of oppositely directed air-exits, plunger valves in said chambers, pins projecting from said valves on opposite sides thereof, and rolling members arranged to engage said pins so as to cause the valves to tend to close one of said exis, respectively, in accordance with the direction of tilt of the gyro spin axis, to apply a precessing torque to the gyro wheel through the unbalanced air jet emerging from the other exit.

7. In a gyroscopic navigational instrument, a gyro wheel, an air-tight casing around the gyro wheel, valve chambers connected with said casing and each having oppositely directed air exits, rolling members in said chambers, and means controlled by said rolling members to tend to close one of said exits, respectively, in accordance with the direction of tilt of the gyro spin axis, to apply a precessing torque to the gyro wheel through the unbalanced air jet emerging from the other exit.

8. In a gyroscopic navigational instrument, a gyro wheel having a normally vertical spin axis, a casing therefor having a chamber with oppositely directed orifices, an outer gimbal, said casing constituting the inner gimbal, whereby the gyro wheel and casing are universally supported, rolling valve means in said chamber to tend to close one of said orifices in accordance with the tilt of the gyro spin axis, to apply a precessing torque to the gyro wheel through the unbalanced air jet emerging through the other orifices, the outer gimbal being supported by a bearing on one side only of said casing, a dial having a slot connected to said outer gimbal, and an indicator fixed to the inner gimbal and projecting through said slot so that the extent of movement between the dail and the indicator can be read.

9. In a gyroscopic navigational instrument, a gyro wheel having a normally vertical spin axis, a casing therefor having a chamber with oppositely directed orifices, rolling valve means within said chamber tending to control the opening and closing of said orifices, whereby when the axis of the gyro wheel departs from the normal position one of said orifices will tend to close so as to apply a precessing torque to the gyro wheel through the resulting unbalanced air jet, an outer gimbal supported by a bearing on one side only of the casing, said casing constituting the inner gimbal, forming a universal support for the gyro and casing, a dial having a slot connected to said outer gimbal, and an indicator fixed to the casing and projecting through said slot so that the extent of movement between the dial and the indicator can be read, and a second indicator stationary with respect to the casing and cooperating with said dial to indicate the extent of movement between the second indicator and the dial.

DOUGLAS GEORGE KING MOSS.

DISCLAIMER 2,036,229.—*Douglas George King Moss*, Sanderstead, England. GYROSCOPIC NAVIGATION INSTRUMENT. Patent dated April 7, 1936. Disclaimer filed November 16, 1937, by the patentee.

Hereby enters this disclaimer to claim 3 in said specification.

[*Official Gazette December 7, 1937.*]

DISCLAIMER 2,036,229.—*Douglas George King Moss*, Sanderstead, England. GYROSCOPIC NAVIGATION INSTRUMENT. Patent dated April 7, 1936. Disclaimer filed November 16, 1937, by the patentee.

Hereby enters this disclaimer to claim 3 in said specification.

[*Official Gazette December 7, 1937.*]